May 11, 1965 R. G. LINS 3,183,339

CUTTING SOLID DIELECTRIC MATERIAL WITH RADIO-FREQUENCY ENERGY

Filed Oct. 5, 1962

INVENTOR
RAYMOND G. LINS
BY Marvin Jacobson
ATTORNEY

United States Patent Office 3,183,339

Patented May 11, 1965

3,183,339
CUTTING SOLID DIELECTRIC MATERIAL WITH RADIO-FREQUENCY ENERGY

Raymond G. Lins, 2035 Opal Place, St. Paul 11, Minn.

Filed Oct. 5, 1962, Ser. No. 228,571
4 Claims. (Cl. 219—383)

This invention relates generally to cutting of solid dielectric materials and more specifically is directed towards means and methods for cutting said material with radio-frequency energy.

There has been an ever increasing trend in the electronics field toward miniaturization of components and circuitry to a degree such that the present day developments are directed toward micro-miniaturization. Although the instant invention is not limited to utility in the field of electronics, its advantages and features can be most clearly pointed out with relation to that field and further it is anticipated that the greatest utility will be in micro-miniaturization of electronic circuitry. The latter is referred to generically as micronics.

The development of micronics has led to the production of not only micro-miniature components such as transistors, resistors, capacitors, etc., but also to the creation of entire circuits comprising a plurality of electrically interconnected components of this nature. Magnetic thin films for use as memory or logical switching elements for electronic computers are a typical product of micronics. These magnetic thin films, which may be of the type produced as described in Patent 2,900,282 on Method of Treating Magnetic Materials and Resulting Articles issued to Sidney M. Rubens, but not limited thereto, may be disc-like members in the order of 0.020 inch diameter and in the order of 1500 A. thick which are deposited or printed on an insulating substrate of dielectric material, such as glass, which is in the order of two to 35 mils thick. Although a plurality of these thin magnetic films may be deposited in a predetermined pattern on a large area of substrate to form, along with associated electrical conductors, a memory or switching array, in many instances it is desirable to use the thin films as individual elements. This requires that they, along with the supporting portion of substrate, be cut out and removed from the larger portion of the substrate. This is true also in the case of micro-miniature circuitry which is deposited or printed on a thin wafer of substrate when it is desirable to enclose or encapsulate each of the circuits as a separate circuit element. Previous methods of removal, such as scribing a pattern on the substrate and breaking the substrate along the scribe mark, have resulted in jagged cuts as well as damage to the film elements. Because of the thinness of the dielectric substrate layer and its crystalline structure, extraneous breakage along a path other than the scribe line occurs and undesirable separations of the film from the substrate also occur.

It is an object of this invention to provide for substantially smoother cutting through a layer of dielectric material.

It is a further object of this invention to achieve the objective above especially in relation to relatively thin layers of dielectric material.

Still a further object of this invention is to achieve the foregoing objectives without limiting the cutting pattern.

Yet another object of this invention is to provide for cutting through a layer of dielectric material with substantially no manual handling of the material.

A further object of this invention is to provide for cutting out portions of a layer of dielectric material on which is mounted electronic components and circuitry or both by non-physical means without affecting the electrical operation of the components or circuits.

Briefly, under the teachings of this invention, a concentration of radio-frequency (R-F) energy is caused to pass through the layer of material to be cut. The amount of energy and the frequency are such as to effect a localized low impedance conduction path through the material along the line of travel of the radio-frequency wave. Almost simultaneously with the above conduction, probably due to ionization as a result of elevated temperature within the material, a plasma conduction occurs forming a spark through the material. The localized heat due to the spark causes a separation of the material along the conduction path. As the radio-frequency energy is applied to the material in a closed loop pattern, such as a circle, there is effected a relatively smooth cutout of a piece of material as defined by the circle and thickness of the substrate.

These and other objects and features of this invention will become apparent in the course of the following detailed description, reference being had to the accompanying drawings in which.

Figure 1:
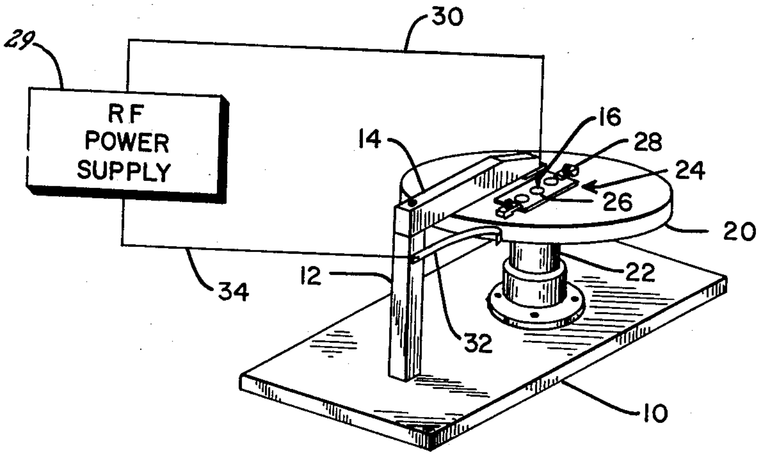
FIG. 1 is an illustrative embodiment of an apparatus for performing the function of this invention.

Referring now to FIG. 1, there is shown a bottom base plate member 10 in a horizontal plane to which is fixedly attached a post member 12 which extends vertically upward from the top surface of the base member. An arm 14, which is attached at one end to the top of the post member, extends horizontally from the post member and has an electrically conductive probe 16, shown in greater detail in FIG. 2, coupled to its opposite end. Illustrative means of attachment of the probe to the arm will be subsequently described in greater detail with reference to FIG. 2. As shown most clearly in FIG. 2, the probe 16 is cylindrical and vertically aligned having a pointed end 18 facing downward toward the base. Since the probe is utilized to apply R-F energy to the material to be cut, it obviously is electrically insulated from the arm 14.

Underneath the probe is a substantially flat circular holding plate 20 which is in a plane substantially parallel to the base member. An axle, 22, which is journalled at one end in the base plate 10 is fixedly attached concentrically to the holding plate 20 to elevate it from the base. In this manner the holding plate can be axially rotated 360° in a substantially horizontal plane. The holding plate 20 is made of material which is a good electrical and heat conductor to serve as an electrical return and a heat sink.

Lying on the upper surface of the holding plate 20 is a layer of the dielectric material to be cut, indicated generally as 24, having thin-film elements, shown as circular areas 26, mounted on its top surface. For illustrative purposes these thin film elements can be considered to be magnetic thin-films as described in the Rubens patent, supra, which are deposited in bonding attachment to the dielectric material, a substrate of glass of approximately five mil thickness. A pair of clamps, 28, detachably secure the dielectric layer to the holding plate 20 and additionally may be arranged to apply stress to the material.

Radio-frequency energy from an R-F power supply, 29, is applied to the probe 16 via line 30. A wiper 32 in sliding contact with the holding plate 20 is electrically connected to the power supply 29 via line 34 to provide a return path for the R-F signal after it passes through the dielectric material.

Figure 2:
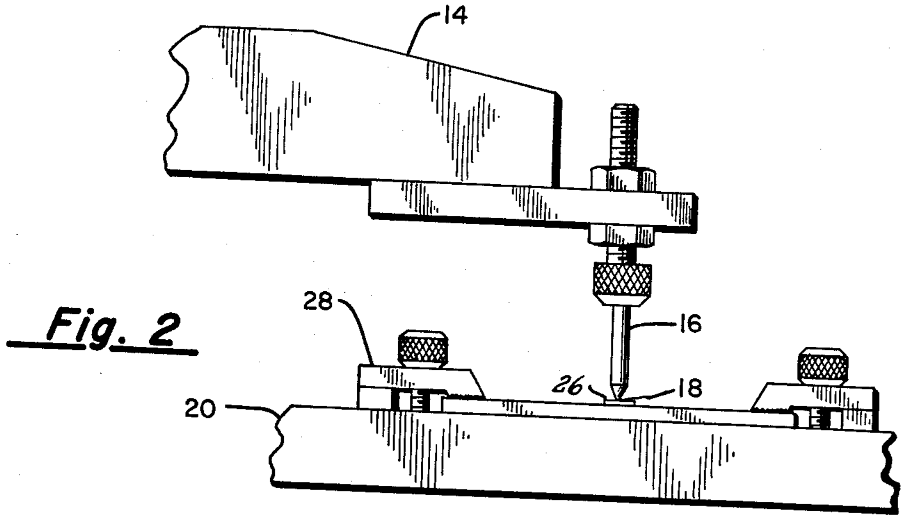
FIG. 2 is an enlarged view of a portion of FIG. 1.

In FIG. 2, the probe 16 is shown as threadably engaged with the arm 14 as one means of attachment thereto. Preferably, the point of the probe is positioned to contact the dielectric material, as shown in FIG. 2. It has been found, experimentally, that cleaner, faster, and more efficient cutting is achieved by having the probe point in contact with the dielectric material. With the probe positioned, the cutting is effected simply by turning on the R-F power supply 29 and rotating the holding plate 20 so that the probe describes a circular pattern around the particular thin film element selected to be cut out. The volume of material defined by the area of the circle and the thickness of the material is separated from the larger section of material, 24, due to effects caused by the R-F energy passing through the material. It is of course obvious that the holding plate 20 can be held stationary while the probe is moved either manually or mechanically. As will become apparent from the following suggested theoretical analysis of what occurs within the material as the cutting energy is applied, the frequency and power is dependent on many factors such as the type and thickness of the material, the proximity of the probe to the material, the geometry of the probe, etc. In general, the optimum settings for power and frequency must be determined experimentally.

In the molecular structure of the dielectric material there are electrically charged dipoles. When the concentrated R-F signal is applied to the layer of material by the probe on one surface and the electrically conductive holding plate on the other surface, there is set up an electrical field through the material which oscillates at the frequency of the R-F signal. Because of the nature of the R-F signal it passes substantially in a straight line path through the material from the point of the probe to the holding plate. The R-F field causes the dipoles along this path, as well as some of those immediately adjacent thereto which are affected by the field, to oscillate. The high frequency of oscillation, in turn, generates heat along the path to cause a dielectric breakdown by the release of electrons from the molecular structure. There results plasma conduction in the form of an arc between the probe and the holding plate and the immense concentrated resulting heat causes a separation of the material along the conduction path. Although the foregoing is not intended as a rigid all-inclusive analysis, it does serve to explain some of the following features of this invention.

Obviously, the frequency of the R-F signal must be high enough so that the dipole oscillation is of sufficient degree to cause eventual direct conduction through the material. On the other hand, the frequency cannot be so high so that the structural limitations of the material prevent the dipoles from responding rapidly enough to the applied signal.

Although the proper frequency is of principal importance, the power of the applied signal must be sufficient to compensate for the heat (caused by the conduction) which is dissipated by convection and conduction so that there is maintained a rapid temperature elevation along the conduction path. It is the rapid rise in temperature differential between one part of the material (the conduction path) and an adjacent part of the material which results in the material cracking or separating along the conduction path. In conjunction with this, it should be pointed out that the holding plate serves a further beneficial function as a heat sink. By providing a good heat conduction path, less heat is randomly transmitted throughout the body of the material so that the achievement of the proper temperature differential is facilitated. It has been found, for example, that efficient cutting is possible by placing the dielectric material on a water surface so that the water serves as the signal return as well as a heat sink.

As previously stated, means for applying stress to the dielectric material, such as the clamps 28, may be of aid in the cutting operation. The cracking of the material is effected by expansion of the material due to localized rapid temperature rise. Since there is a high temperature differential the expansion causes stress in the material which eventually reaches a force sufficient to separate the material. By pre-stressing the material, the degree of stress forces required for separation is reached earlier. Since the nature of the cutting operation is such that the separation of the material along the line of conduction initiates on the surface of the material, the applied stress should be directed toward concentration on the surface and furthermore, surface irregularities along the desired pattern of the cut are beneficial.

In a typical case using the apparatus substantially as shown in the figures, a 35 watt R-F power supply at a frequency in the order of four megacycles was utilized to cut out a .020 inch diameter magnetic thin film which was bonded on a 5 mil thick glass substrate. In the range of frequencies from one to four megacycles this same power supply was used to cut through materials such as Pyrex, hardened and soft glass as well as untreated Pyro-Ceram ranging in thickness from 5–50 mils.

It is understood that suitable modifications may be made in the structure and method as disclosed provided such modifications come within the spirit and scope of the appended claims. Having now, therefore, fully illustrated and described my invention, what I claim to be new and desire to protect by Letters Patent is:

1. A method for effecting a substantially smooth separation through a dielectric material comprising the steps of:

(*a*) placing one side of the material to be separated in juxtaposition with an electrically conductive member in a manner such that any localized heat in the dielectric material due to electrical conduction is substantially dispersed by said member;

(*b*) applying a continuous concentration of radio-frequency energy to the opposite side of the material of sufficient power and of frequency to effect a localized dielectric breakdown of the material to result in a low impedance conductive path for said energy and maintaining this conduction until sufficient heat is generated by the localized conduction to cause a physical separation through the material along the localized conductive path.

2. The method of claim 1 further including the step of:

(*c*) tracing a closed loop pattern while applying the radio-frequency energy as in step *b* to cut out a section of the dielectric material.

3. Apparatus of the nature described, comprising: an electrically conductive plate member upon which the material to be cut is detachably held; means for applying a continuous concentration of radio-frequency energy to the material to be cut so that the energy passes in a straight line through the material to said plate member, said energy characterized by a frequency of oscillation and energy level such that concentrated heat is generated along said straight line path through the material to a degree to cause separation of the material along said path; and means for moving the material with respect to said energy applying means while the energy is applied in said manner such that contiguous separation lines are formed to sever said material into sections.

4. The invention as described in claim 3 wherein said energy applying means comprises: a source of radio-frequency energy electrically connected to a probe, said probe having a pointed end juxtaposing said dielectric material.

References Cited by the Examiner

UNITED STATES PATENTS

| | | | |
|---|---|---|---|
| 1,493,014 | 5/24 | Boyle | 120—42.07 |
| 1,810,212 | 6/31 | Hinds | 219—240 X |
| 2,248,057 | 7/41 | Bond | 219—383 |
| 2,763,759 | 9/56 | Mito et al. | 219—384 |
| 3,017,486 | 1/62 | Kogan et al. | 219—383 |
| 3,020,377 | 2/62 | Shawfrank | 319—384 |
| 3,044,920 | 7/62 | Dewar | 219—383 X |

OTHER REFERENCES

F 16,502 VIId/21h, 2/56, Germany.

RICHARD M. WOOD, *Primary Examiner.*